C. G. PATTERSON.
VACUUM AND WATER CONNECTIONS.
APPLICATION FILED OCT. 29, 1908. RENEWED NOV. 5, 1912.
1,078,552.  Patented Nov. 11, 1913.
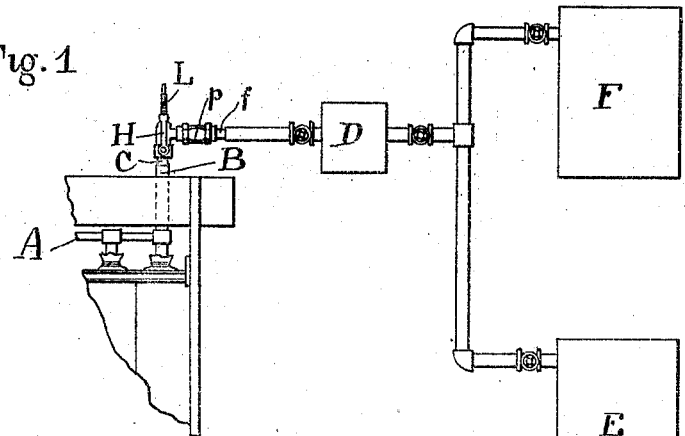
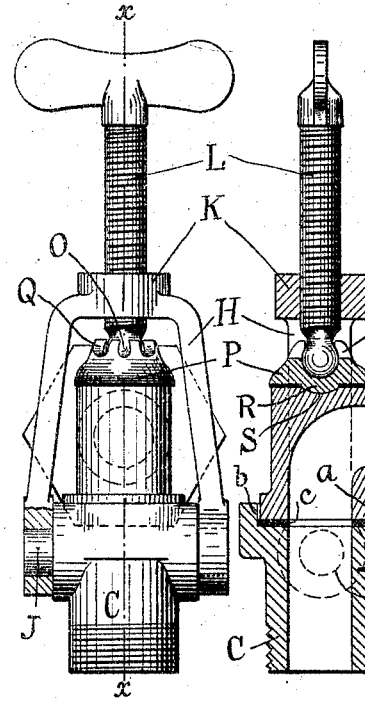
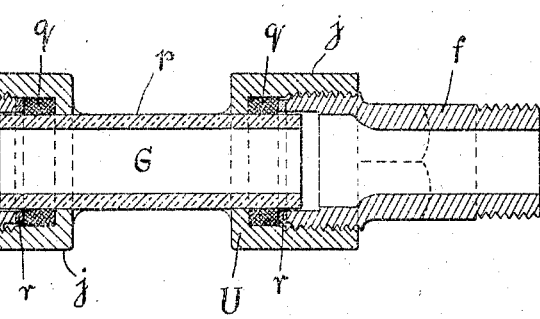
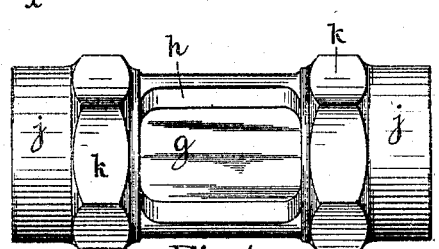
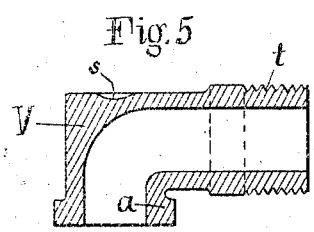
Witnesses
E. P. LaGay
E. Van Zandt
Clarence G. Patterson Inventor
By his Attorneys

UNITED STATES PATENT OFFICE.

CLARENCE G. PATTERSON, OF BERKELEY, CALIFORNIA, ASSIGNOR TO THE BUTTERS PATENT VACUUM FILTER COMPANY, INC., A CORPORATION OF NEVADA.

VACUUM AND WATER CONNECTIONS.

1,078,552.  Specification of Letters Patent.  Patented Nov. 11, 1913.

Application filed October 29, 1908, Serial No. 460,069. Renewed November 5, 1912. Serial No. 729,657.

*To all whom it may concern:*

Be it known that I, CLARENCE G. PATTERSON, a citizen of the United States, and a resident of Berkeley, California, have invented certain new and useful Improvements in Vacuum and Water Connections for Filter-Frames, of which the following is a specification accompanied by drawings.

This invention relates to an improved vacuum and water connection for vacuum filter frames, but is not limited thereto.

In its most complete and preferred form it provides interchangeable connections that can be very quickly connected and disconnected.

It also provides a glass or transparent section by which the flow in the pipe can be seen.

I will for convenience describe the invention as applied to alternative vacuum and water connections.

Further objects of the invention will hereinafter appear and to all of these ends the invention consists of a device hereinafter fully described and claimed in this specification and shown in the accompanying drawings, in which—

Figure 1 is a side elevation of a filter frame and vacuum and water connections embodying the invention; Fig. 2 is an end elevation of the male and female unions for the vacuum connection; Fig. 3 is a longitudinal sectional side elevation on the line $x, x$ of Fig. 2; Fig. 4 is a side elevation of the protecting casing for the gage glass; Fig. 5 is a sectional side elevation of the male union for the water connection.

Referring to the drawings A represents a suitable filter frame and B is the pipe connection therefor to which suction or pressure may be applied. In this instance the pipe B is provided with the interiorly screw threaded end to which the female union C is adapted to be fitted. This female union C is adapted to interchangeably receive either the vacuum connection T shown in Fig. 3 or water connection V shown in Fig. 5 as desired. The vacuum connection is adapted to be connected to the pump D which discharges into the tank E when a vacuum is applied to the filter frame. If desired water from an elevated tank F under control of valves as shown can be passed to the pipe B directly through the same connection (the pump being reversed) but it will be seen that the invention provides means for securing a separate interchangeable connection V shown in Fig. 5 for a separate pipe. For the vacuum connection a gage glass G is provided and this should preferably not be used when water is being forced into the filter frame.

Referring more particularly to the drawings, the female union C is provided with a swinging bridle H pivoted to the union on the trunnions J, so that the bridle may be swung through the arc of a circle. The bridle is provided with an interiorly screw threaded socket K in which is mounted a hand screw L. The end of the screw is preferably rounded at O to form a ball to which is secured the button P. This button is preferably provided with the fingers Q which are bent over the ball O to secure the button to the ball. The button is also preferably provided with a projecting or convex portion R adapted to enter a recess or concave seat in the male union T, so that when the screw L is tightened up the male union is held firmly in position on the female union.

The male union for vacuum connections comprises the elbow T preferably provided with shoulder $a$ adapted to be seated in the socket or recess $b$ in the female union C. A gasket $c$ is arranged between the two unions and preferably a gasket $d$ is provided between the button P and the union T. The other end of the elbow T is shown in this instance exteriorly screw threaded at $e$ and is adapted to be connected to the nipple $f$ by means of the protecting glass holder U. The nipple $f$ is screw threaded to receive the glass holder, which holder is preferably in the form of a substantially tubular casting, open at the sides at $g$ and having the connecting ribs $h$ which connect the end sockets $j$. These sockets as shown are provided with squared or octagonal portions $k$ to receive a pipe wrench.

The gage glass $p$ is arranged within the glass holder and over the ends of the gage glass are placed the gaskets $q$ and washers $r$ which are compressed between the holder and the union T and the nipple $f$, thereby forming a tightened joint. The nipple $f$ is adapted to be suitably connected to the pump D.

When it is desired to force water or other liquid into the filter frame, the male union T is removed from the female union C, and the male union V for water connections substituted therefor. This male union V is in the form of an elbow and is also provided with the socket or depressed portion s to receive the button P. The union V is also exteriorly screw threaded at t to enable the water pipe to be connected thereto in any suitable manner.

According to this invention the vacuum and water connections are interchangeable on the female union C and the gage glass is connected to the vacuum connection and forms one part thereof which is always ready for use when the vacuum connection is connected up to the union C. The vacuum and water connections may be readily changed when desired with quickness and despatch, and at all times tight joints are provided.

I claim and desire to obtain by Letters Patent the following:

In combination with a pipe connection, of interchangeable connections therefor comprising a female union adapted to be connected to said pipe connection and provided with a swinging pivoted bridle, a screw carried by said bridle, a male union for making one connection adapted to be secured to the female union by the said screw, said male union being provided with a gage glass, and another male union for making another connection interchangeable with the first said male union.

In testimony whereof I have signed this specification in the presence of two subscribing witnesses.

CLARENCE G. PATTERSON.

Witnesses:
G. W. S. SIMPSON,
H. HUSTEDT.